United States Patent
Jändel

[19]

[11] Patent Number: 6,122,322
[45] Date of Patent: Sep. 19, 2000

[54] SUBLIMINAL MESSAGE PROTECTION

[75] Inventor: Magnus Jändel, Upplands Väsby, Sweden

[73] Assignee: Telefonaktiebolaget LM Ericsson, Stockholm, Sweden

[21] Appl. No.: 09/310,739

[22] Filed: May 13, 1999

Related U.S. Application Data

[63] Continuation of application No. PCT/SE97/01909, Nov. 13, 1997.

[30] Foreign Application Priority Data

Nov. 19, 1996 [SE] Sweden .................................. 9604241

[51] Int. Cl.⁷ ................................ H04N 5/14; H04N 9/64
[52] U.S. Cl. .................... 375/240.13; 348/154; 348/473; 348/699; 358/908
[58] Field of Search ........................ 346/46, 94; 358/908; 348/699, 700, 473, 475, 553, 154, 155; H04N 5/14, 9/64

[56] References Cited

U.S. PATENT DOCUMENTS

| | | | |
|---|---|---|---|
| 5,099,322 | 3/1992 | Gove ....................... | 358/105 |
| 5,642,174 | 6/1997 | Kazui et al. .............. | 348/700 |
| 5,644,363 | 7/1997 | Mead ....................... | 348/563 |
| 5,719,643 | 2/1998 | Nakajima ................. | 348/700 |
| 5,751,378 | 5/1998 | Chen et al. .............. | 348/700 |
| 5,801,765 | 9/1999 | Gotoh et al. ............. | 348/155 |
| 5,929,920 | 10/1999 | Sizer, II .................. | 348/473 |
| 5,969,755 | 10/1999 | Courtney ................. | 348/155 |

FOREIGN PATENT DOCUMENTS

| | | |
|---|---|---|
| 4106246 C1 | 3/1992 | Germany . |
| 95/06985 A1 | 3/1995 | WIPO . |

*Primary Examiner*—Howard Britton
*Assistant Examiner*—Nhon T Diep
*Attorney, Agent, or Firm*—Nixon & Vanderhye, PC

[57] ABSTRACT

The present invention relates to a method and to a system for detecting a first context change between two frames. When a second context change between a further two frames occurs within a predetermined time interval, the frames accommodated within the two context changes are defined as a subliminal message. An alarm is sent to an observer upon detection of a subliminal message.

19 Claims, 8 Drawing Sheets

SUBLIMINAL MESSAGE PROTECTION

This is a continuation of PCT application Ser. No. PCT/SE97/01909, filed Nov. 13, 1997.

The present invention relates to a system and to a method for protecting an observer from subliminal messages.

BACKGROUND OF THE INVENTION

Subliminal messages are messages that are sent in a manner such as to be undetectable consciously by an observer. Subliminal messages are hidden suggestions that can only be perceived by the subconscious. In video communication, a subliminal message can be flashed so quickly that the viewer will not be aware of having seen the message. The viewer can, nevertheless, be influenced by the message content. Consider, for instance, the case of a subliminal advertisement that is sent while the viewer is studying the latest televised news from the stock market. The advertisement may inform the viewer that ACME chocolate is good to eat, but is flashed so quickly that the viewer is unaware that he/she has been subjected to an advertisement. Some viewers, however, can be influenced subconsciously by the advertisement, and later feel an unexplainable longing for ACME chocolate.

The ground-based transmission of television channels are subject to ethical and legal constraints that are aimed towards preventing the above type of advertising. However, it is not possible to guarantee the prevention of the transmission of subliminal messages in many of the international satellite-based television channels that do not obey local laws and regulations. The protection of an observer from such messages is more difficult to achieve in modern types of communications, such as Internet and videotelephony, for instance. Subliminal messages can be hidden not only in a video sequence, but also in still images, or what the observer considers to be still images, and also in audio sequences.

Two mutually sequential images of an image sequence are seldom exactly the same. The fundamental concept of mediating movement with the aid of a plurality of mutually sequential images is that each image will differ slightly from the preceding image. When the images are shown at speed, this is perceived by the eye as a movement and not as a presentation of individual images, by virtue of the eye having a certain degree of inertia. In the majority of cases, only a small part of the image frame is involved in the actual movement; compare a walking person against a stationary background in this regard. This feature is used for different types of image sequence compression, such as MPEG2, for instance. MPEG2 saves space in the image sequence, by sending, among other things, approximative information that describes those pixels that change. However, this results in the introduction of errors in the image sequence, making it necessary to synchronise the image at regular intervals. This is achieved with a so-called I-image that contains all information necessary to compile a complete image.

Image sequences also include a row of different frames in order to enable a moving image to be transmitted in the most effective manner possible. A frame contains image information that is presented on a medium, possibly together with further frames, to form an image or picture. For instance, an interlaced image is comprised of two frames. The term frame will be used consistently throughout the following description. By frame is meant information that is used to compile an image. A frame can itself include a complete image, or solely parts of an image, or information from which an image can be calculated An I-frame is a complete frame that includes image information. Because an I-frame contains a great deal of information, it is expensive to transfer. A new P-frame can be formed from an I-frame or from a P-frame. A P-frame, (prediction frame) is formed by transferring to the receiver side movement vectors and DFD (Displaced Frame Difference) related to the preceding frame. The movement vectors describe how objects in the preceding frame shall be moved to form the P-frame. When the new P-frame is formed, errors will occur due to rounding-up, for instance. DFD describes how the calculated P-frame differs from the original image. The difference between the values of each pixel in the calculated frame and in the original frame can be calculated with regard to black-white frames. A colour frame that uses RGB (Red, Green, Blue) can be transformed to a form in which one portion consists of a luminance part. The luminance part can be used to calculate the DFD, in this case. A P-frame is more cost-effective than an I-frame, since movement vectors plus DFD contain much less information than a corresponding I-frame would contain. Also included are B-frames which are calculated from preceding and succeeding P-frames.

The expression subliminal message is also used to describe a code where a number of encrypted messages are encoded within the same set of symbols. This has no relationship at all with the present invention.

Described in U.S. Pat. No. 5,151,788 is a system for identifying and eliminating advertisements in and from a video signal, by detecting blank images. The concept of this solution cannot be applied to subliminal messages, because subliminal messages are not normally preceded by a blank image.

Described in FR 2,622,077 is a system for detecting discontinuities between images, by analyzing an analogue video signal line-by-line. The concept is not applicable to the present invention, since subliminal messages do not differ from other signals when considered line-by-line.

SUMMARY OF THE INVENTION

The present invention addresses the aforesaid problems, by detecting subliminal messages and warning an observer of their presence.

The object of the present invention is thus to protect an observer against subliminal messages.

The aforesaid problems are solved by the present invention, by detecting subliminal messages and warning an observer of their presence, by detecting a context change between two frames.

More specifically, there is detected a first context change between two frames. When a second context change occurs between a further two frames within a predetermined time period, the frames accommodated within the two context changes are defined as an subliminal message. When a subliminal message has been detected, an alarm is sent to an observer.

A context change can be defined as a major change in the content of a frame; c.f. a scene change, for instance.

A frame point can be defined as a value in a point in an image that together with other frame points compiles said image.

The present invention provides the advantage of enabling subliminal messages to be detected and stored for later analysis.

Another advantage is that an observer can be protected against and warned of the presence of subliminal messages.

The invention will now be described in more detail with reference to preferred embodiments thereof and also with reference to the accompanying drawings.

DETAILED DESCRIPTION OF PREFERRED EMBODIMENTS

Figure 1:
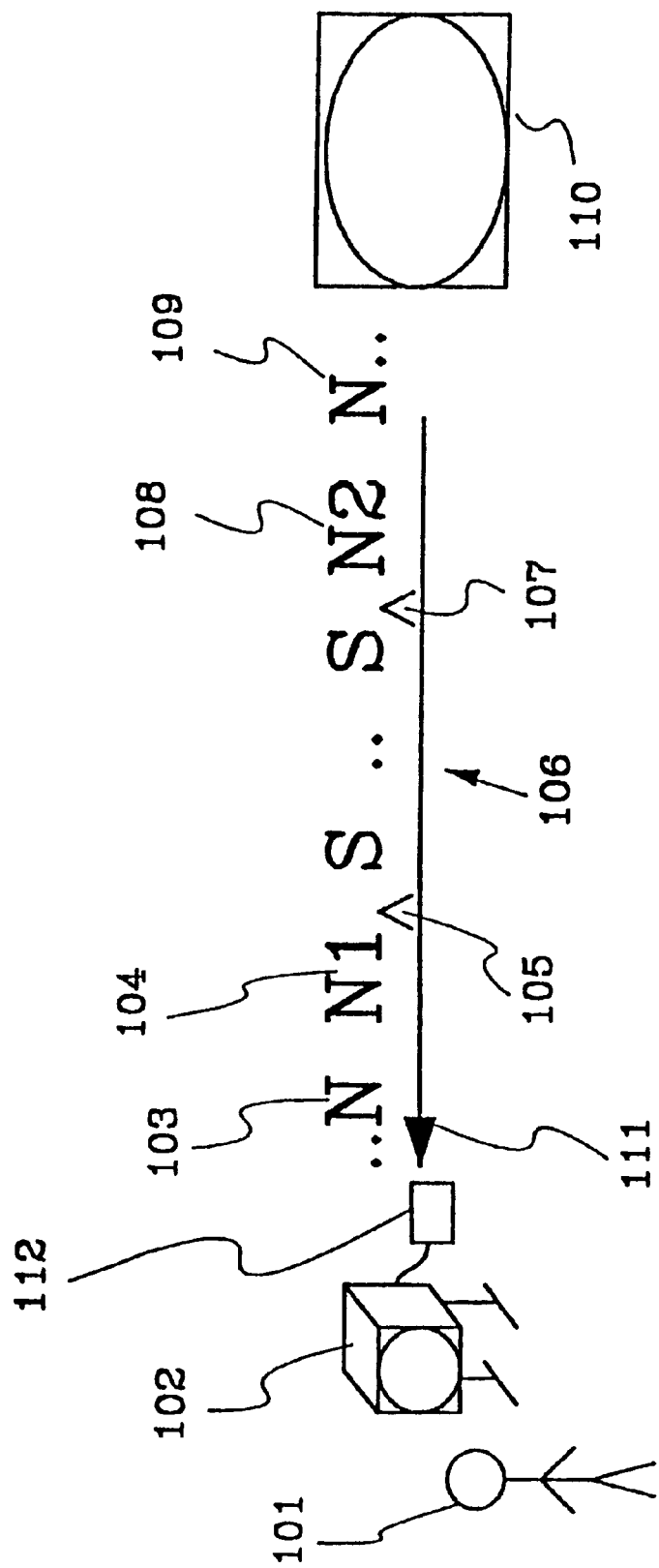
FIG. 1 is an overview of one embodiment according to the invention.

FIG. 1 is an overview of one embodiment of the invention. Reference numeral 101 identifies an observer or viewer watching a film on a television 102. Although the term film and television are used in describing this embodiment, it will be understood that equivalent terms can be used instead, for instance such terms as MPEG-sequence and data terminal. The reference numeral 111 identifies a frame sequence sent to the television 102 from a source 110. The sequence of frames 111 arrives at the television 102 via an SMP-module 112 (Subliminal Message Protection). The SMP-module may alternatively be integrated with the video decoder. The source 110 may, for instance, be a cable-TV distributor, an SP (Service Provider) or a computer connected to Internet or Intranet. FIG. 1 shows part of a frame sequence 111, where reference 103 identifies a frame in the normal sequence. Reference 104 also identifies a frame in the normal sequence, although in the illustrated case the frame 104 constitutes the last frame that occurs in the normal sequence prior to the occurrence of a context change 105. A context change can be defined as a major change in the content of a frame; c.f. a scene change for instance. The context change 105 is followed by a series of frames which together constitute a subliminal message 106. The subliminal message 106 may be comprised of solely one frame or of several mutually sequential frames. Reference 107 identifies a context change which terminates the subliminal message and the normal frame sequence reappears. Reference 108 identifies the first frame in the normal frame sequence, while reference 109 identifies the next following frame. The SMP-module 112 detects the context changes 105 and 107. As soon as the context changes 105 and 107 occur within a specified time interval, an alarm is generated and the subliminal message 106 is stored and can be played back by the observer 101.

Figure 2:
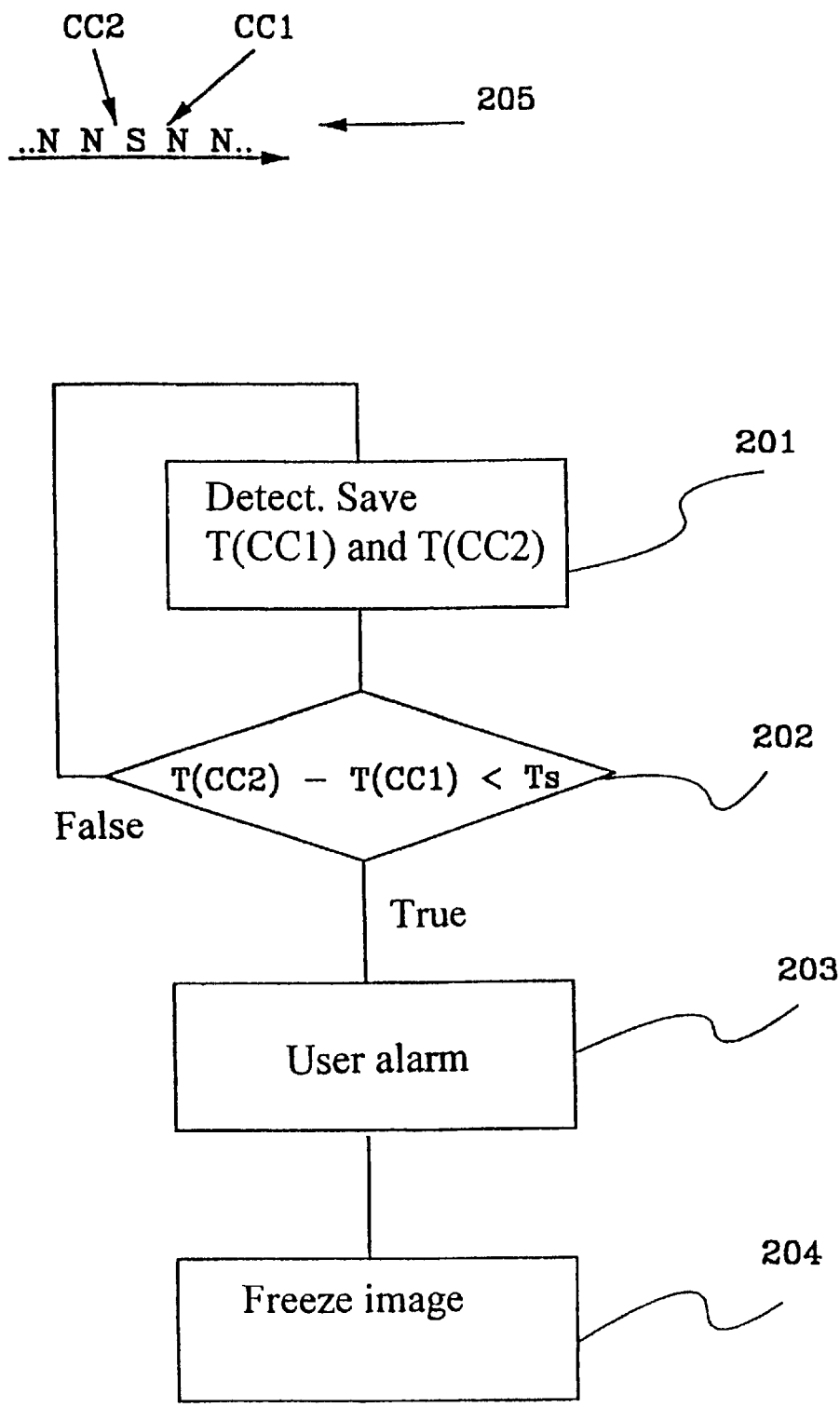
FIG. 2 is a flowchart illustrating one embodiment of the invention.

FIG. 2 is a flowchart illustrating one embodiment of the invention. Reference 205 identifies a frame sequence. Reference CC1 identifies a context change between the normal frame sequence N and those frames that constitute the subliminal message S. Reference CC2 identifies a context change between the subliminal message S and the normal frame sequence N. Each frame that arrives at an SMP-module (not shown) is compared with the last frame to arrive, and context changes are detected, in accordance with box 201. The time at which the two latest context changes occurred is saved. The time difference between the latest two context changes to take place is calculated in accordance with box 202. When the time difference is smaller than a threshold value Ts, a user alarm 203 is triggered and the image frozen, in accordance with box 204. The observer is then able to ascertain whether or not he/she has been subjected to a subliminal message and, if so, the nature of the message.

Figure 3:
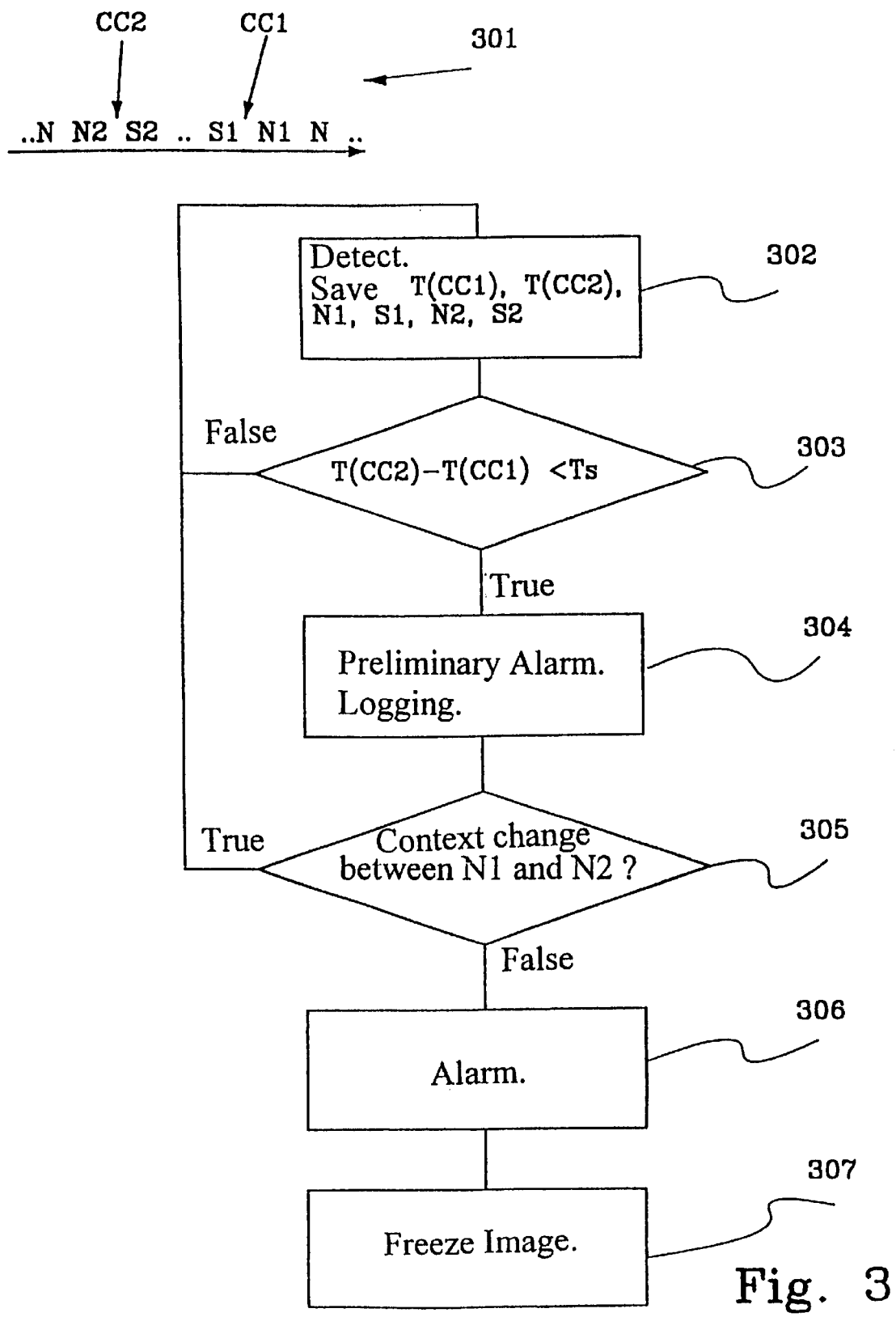
FIG. 3 is a flowchart illustrating another embodiment of the invention.

FIG. 3 is a flowchart illustrating another embodiment of the invention. Reference 301 identifies a frame sequence arriving at an SMP-module (not shown). Reference CC1 identifies a context change in the frame sequence. Reference N1 identifies the last frame in the normal frame sequence, while reference S1 identifies the first frame in the subliminal message. Reference S2 identifies the last frame in the subliminal message and reference CC2 identifies a context change between S2 and N2, where N2 identifies the first frame in the normal sequence after the context change CC2. The SMP-module (not shown) functions to detect context changes, and the time at which these changes occur is saved together with the frames N1, N2, S1 and S2, in accordance with box 302. If the time difference between the latest two context changes CC1 and CC2 is smaller than a given threshold value Ts, box 303, a preliminary alarm is triggered and relevant data logged, e.g. the subliminal message source, the message arrival time, and so on, in accordance with box 304. A test is then run to ascertain whether or not a context change exists between frames N1 and N2. If no context change exists between said frames, an alarm is triggered (box 306) and the frame sequence frozen (box 307). The observer is now able to evaluate consciously the context change that has occurred, through the medium of the frozen frames and the logging activity that has ensued.

Those occasions on which the entire frame has been drastically changed, such as in the case of a scene change, can be mediated with an I-frame in the frame sequence. When the transmission of a subliminal message is commenced, there will occur a scene change that causes a major part of the frame to be changed between two mutually sequential frames. Thus, a context change can occur when the receiver receives an I-frame. When two I-frames are received in succession within a short space of time, the transmission of a subliminal message can be suspected.

Figure 4:
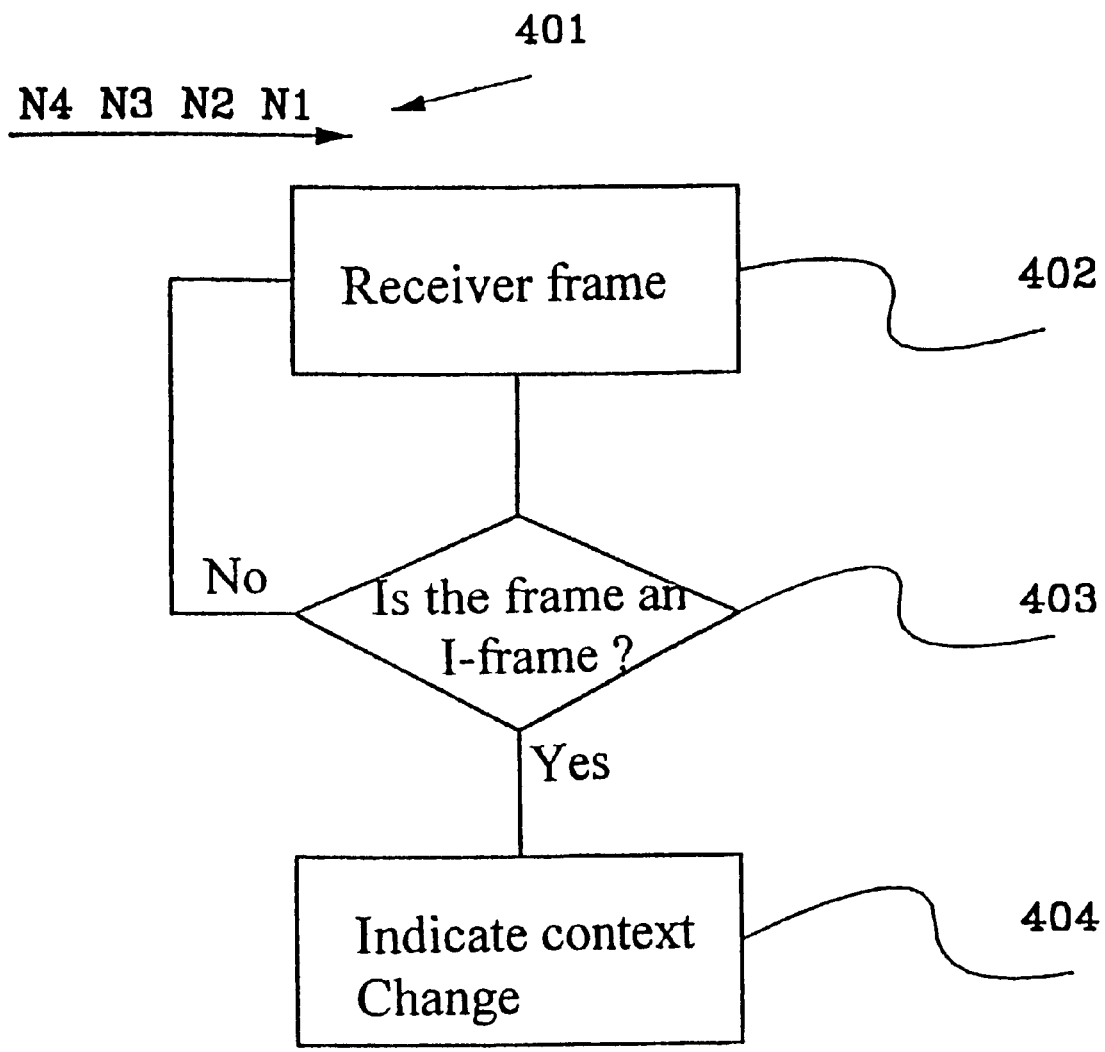
FIG. 4 is a flowchart illustrating the detection of a context change in accordance with one embodiment of the invention.

FIG. 4 is a flowchart that illustrates the detection of changes with the aid of I-frames in an MPEG-sequence. Reference 401 identifies a frame sequence that arrives at an SMP-module (not shown). The SMP-unit receives a frame, box 402, and ascertains whether or not the frame received is an I-frame, box 403. The receipt of an I-frame indicates a context change, box 404.

Figure 5:
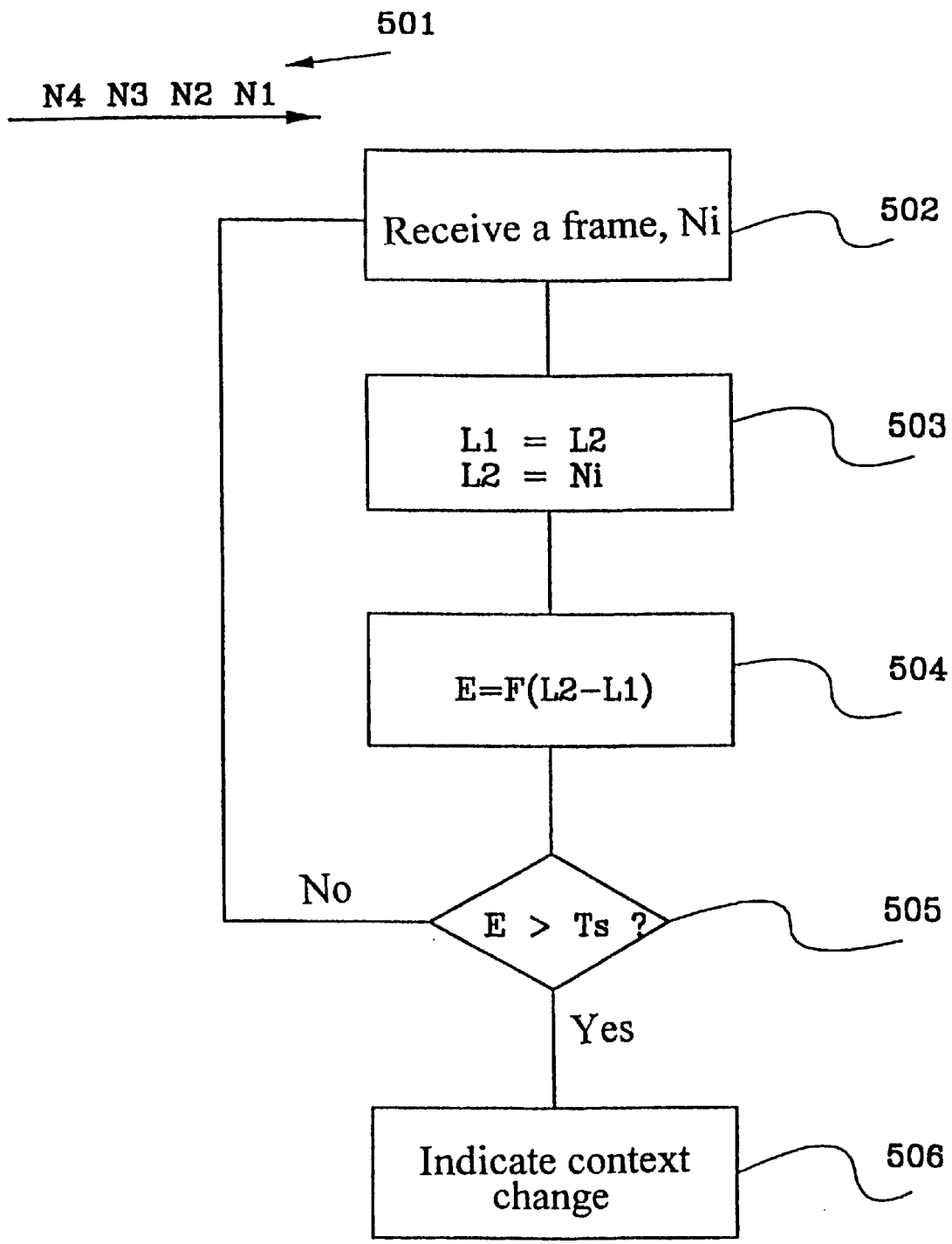
FIG. 5 is a flowchart illustrating the detection of a context change according to another embodiment of the invention.

FIG. 5 is a flowchart that illustrates the detection of a context change, by numerically calculating a value of the change between two frames. The reference 501 identifies a frame sequence arriving at an SMP-unit (not shown). The SMP-unit (not shown) receives a frame $N_i$, box 502. The frame $N_i$ is stored in a memory $L_2$. Prior to this, the value of $L_2$ is stored in a memory $L_1$, box 503. A value E of the difference between the frames is then calculated, by summating an energy measurement of the difference between corresponding frame points in the frames $L_1$ and $L_2$, box 504. This energy measurement may, for instance, be $x^2$, which would give the following formula:

$$E = \Sigma (I_s - I'_s)^2$$

s=all pixels where $I_s$ is the value of the frame point s in the frame $L_2$, and $I'_s$ is the value of the frame point s in the frame $L_1$. A context change is indicated when E is greater than a threshold value $T_e$, in accordance with boxes 506 and 506 respectively.

Figure 6:
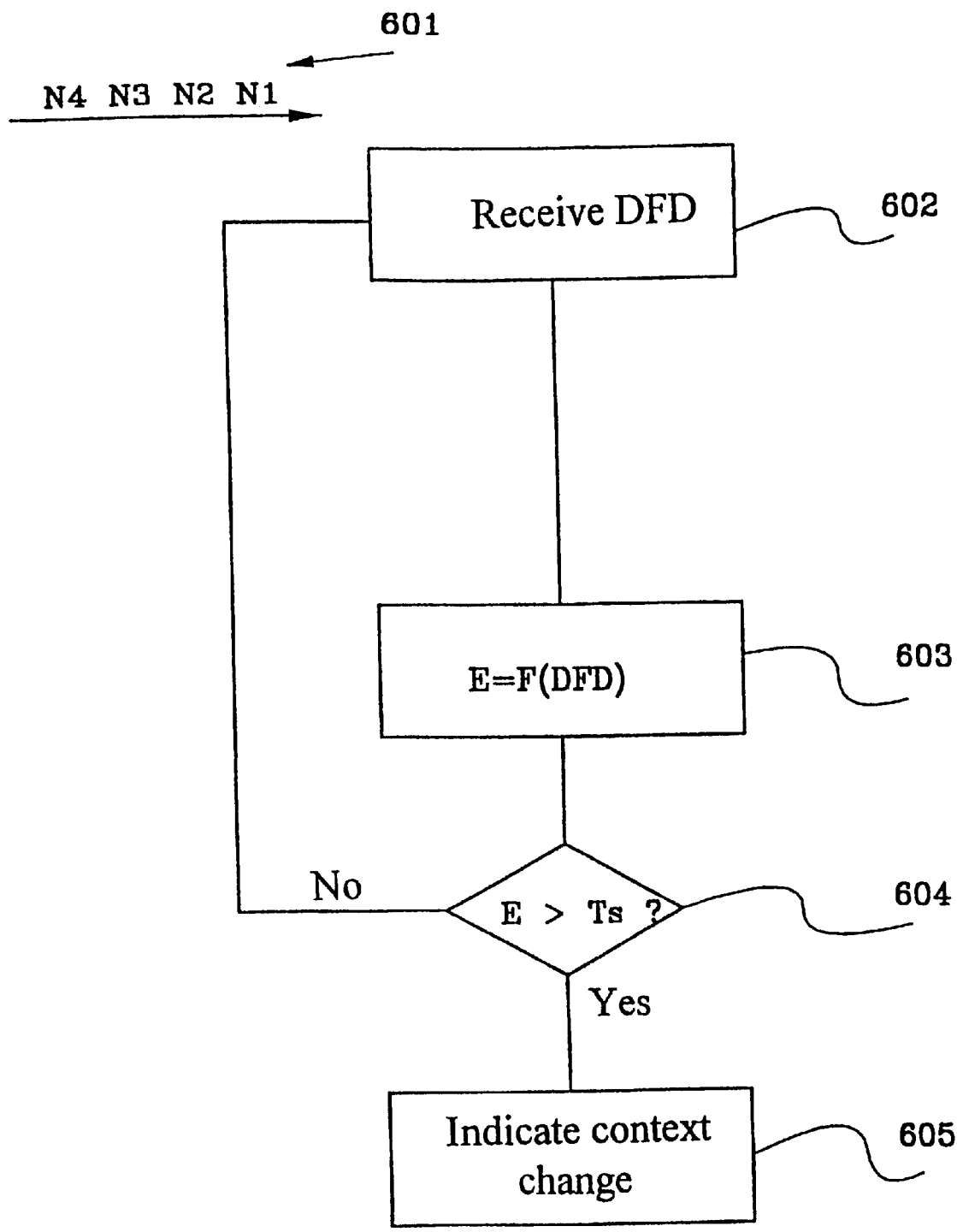
FIG. 6 is a flowchart illustrating the detection of a context change in accordance with still another embodiment of the invention.

As illustrated in FIG. 6, a context change between two P-frames can be detected in a manner similar to that described above, by measuring the energy in the DFD. In FIG. 6, the reference numeral 601 identifies a frame sequence. The energy is calculated, box 603, for each DFD received, box 602. If the amount of energy contained by the DFD is greater than a threshold value 604, this indicates that a context change has taken place, box 605.

Figure 7:
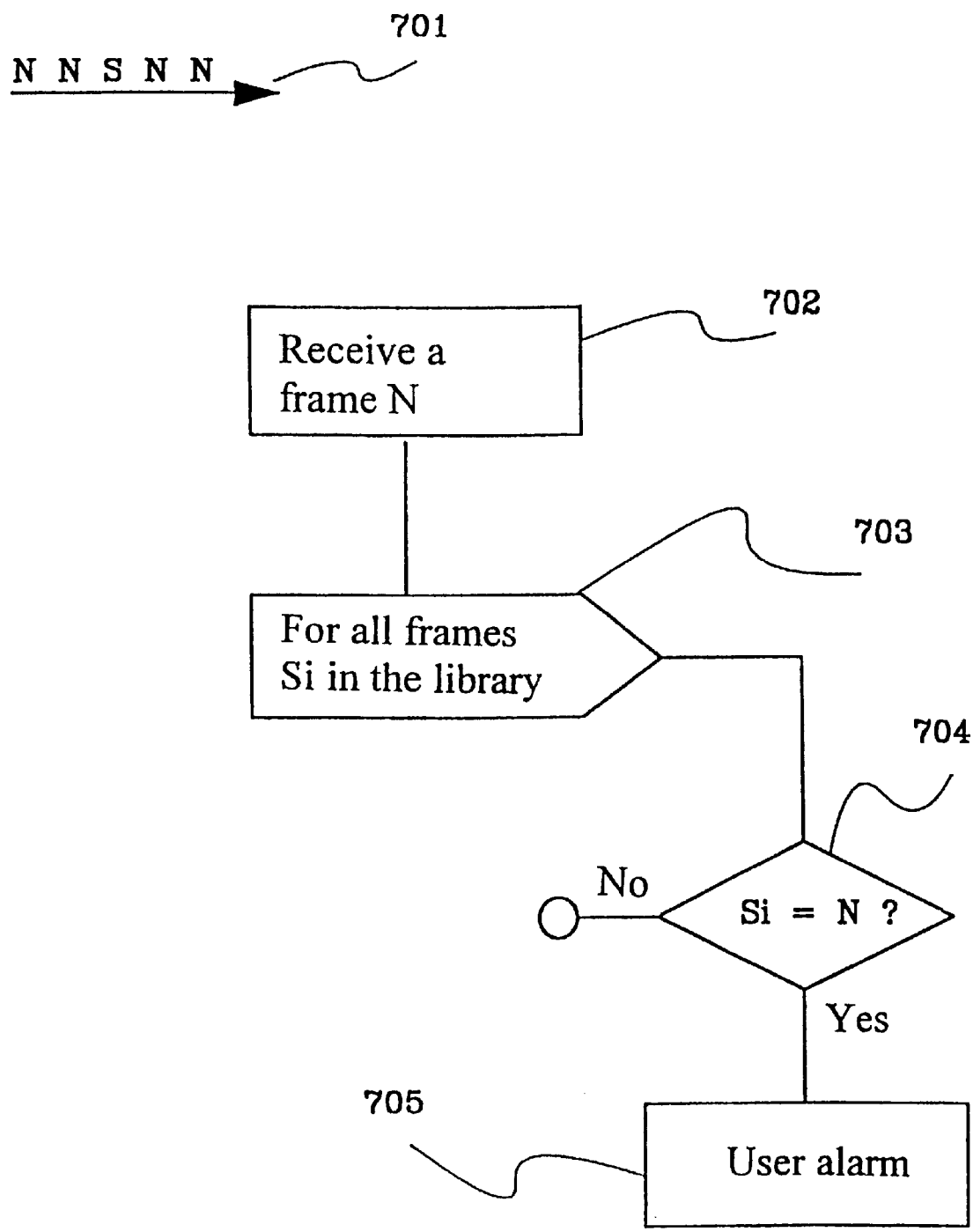
FIG. 7 is a flowchart illustrating the detection of a subliminal message.

The SMP may include a library function that contains data relating to known subliminal messages, as shown in FIG. 7. The reference numeral 701 identifies a frame sequence. Each frame received, box 707, is compared with the frames stored in the library, box 703, and when sufficient similarity is noted, box 704, a user alarm is triggered, box 705. This comparison may be carried out by filtering each frame, so as to present a number of characteristic features. These characteristic features are then compared with the features stored in the library function. One advantage with this procedure is that computer power and memory space are saved.

Figure 8:
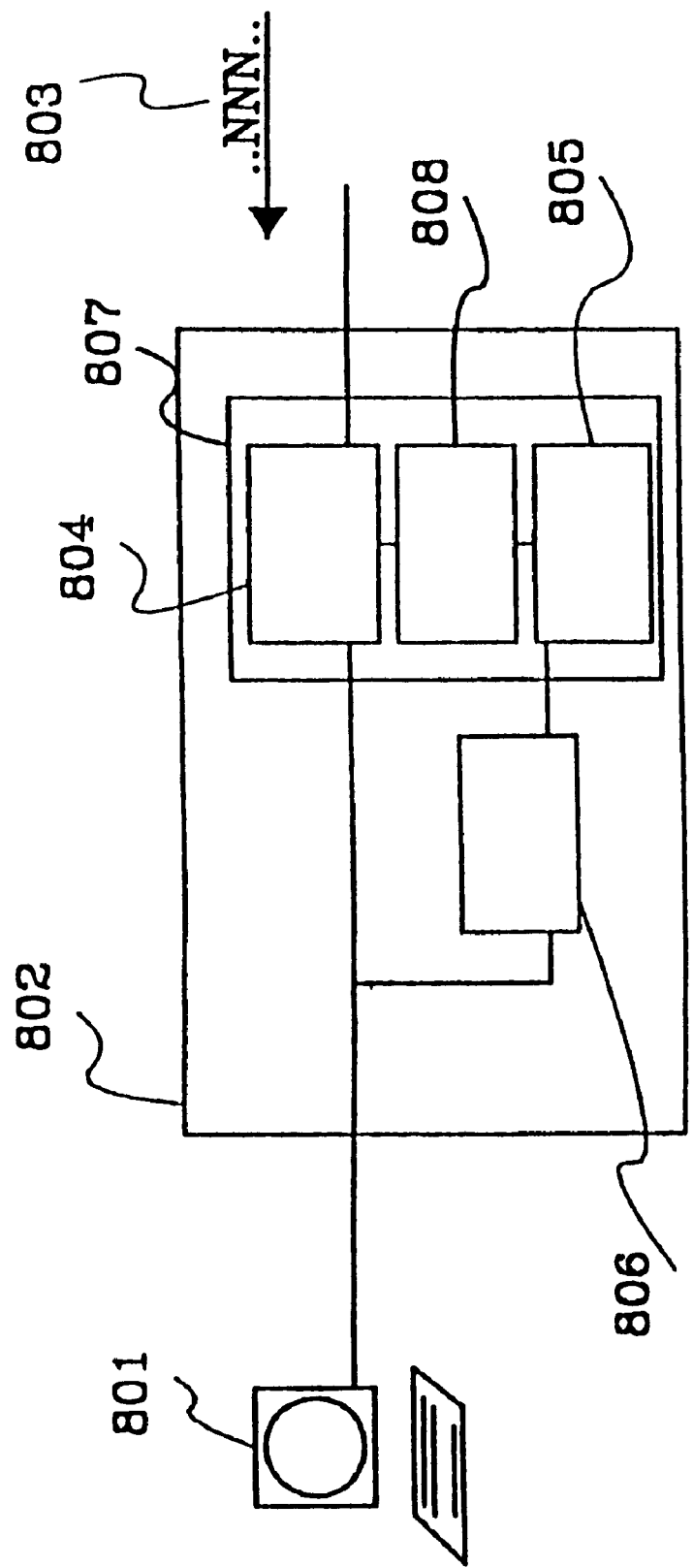
FIG. 8 illustrates a subliminal protection module.

FIG. 8 illustrates in greater detail an SMP-module 802 connected to a monitor 801. A frame sequence arrives at the SMP-unit 803. The frames pass a system 807 which functions to detect context changes. The system 807 includes a part 804 whose function is to measure the energy content of a frame, a part whose function is to compare the energy value with a threshold value 808, and a part whose function is to initiate an alarm. The SMP also includes means for storing a stream or sequence of frames 806.

It will be understood that the invention is not restricted to the aforedescribed and illustrated exemplifying embodiments thereof, and that modifications can be made within the scope of the following claims.

What is claimed is:

1. A method of distinguishing between messages in a sequence of frames that include image information, the method comprising:

detecting a first context change between a first and a second frame, detecting a second context change between a third and a fourth frame, comparing the time period between the first and the second context changes with a first threshold value, and indicating said message in dependence on said comparison.

2. A method according to claim 1, characterized in that relevant data related to the first and second context changes and data relating to the source of the frame sequence are stored in a memory.

3. A method according to claim 1, characterized in that a second message is indicated in dependence on whether a third context change between said first and said fourth frame is detected.

4. A method according to claim 1, characterized in that said first context change is detected by measuring the energy difference between said first and said second frames.

5. A method according to claim 1, characterized in that said second context change is detected by measuring the energy difference between said second and said third frames.

6. A method according to claim 4, characterized in that the energy is measured by calculating, for each frame point, the difference between the value of a frame point in a first frame and the value of the corresponding frame point in a second frame, calculating the square of the calculated difference, and forming the sum of the calculated square values for all frame points.

7. A method according to claim 1, characterized in that said first context change is detected by measuring the energy in a first displaced frame difference (DFD), and using the measured energy to calculate the second frame from the first frame.

8. A method according to claim 1, characterized in that said second context change is detected by measuring the energy in a second displaced frame difference (DFD), and using the measured energy to calculate the fourth frame from the third frame.

9. A method according to claim 7, characterized by comparing the energy in the displaced frame difference with a second threshold value, and indicating a context change in dependence on said comparison.

10. A method according to claim 8, characterized by comparing the energy in the displaced frame difference with a second threshold value, and indicating a context change in dependence on said comparison.

11. A method according to claim 7, characterized in that the energy in the displaced frame difference (DFD) is measured by calculating the square of the value in each frame point in the displaced frame difference and forming the sum of the calculated values for all frame points.

12. A method according to claim 7, characterized in that the energy in the displaced frame difference (DFD) is measured by calculating the absolute magnitude of the value in each frame point in the displaced frame difference and forming the sum of the calculated values for all frame points.

13. A method according to claim 1, characterized in that the first context change is indicated when an I-frame in an MPEG-stream is detected.

14. A method according to claim 1, characterized in that the second context change is indicated when an I-frame in an MPEG-stream is detected.

15. A method according to claim 1, characterized by comparing the second frame with a fifth frame stored in a frame library, and indicating the first message in dependence on said comparison.

16. A method according to claim 2, characterized by storing in said memory the frame sequence between the first and the second context change.

17. A method according to claim 2, characterized in that a user is able to examine the contents of said memory.

18. A method according to claim 1, characterized in that said second frame and said third frame are one and the same frame.

19. A system for automatically detecting subliminal messages in a frame sequence, the system comprising:

means for measuring context changes between two frames in the frame sequence; means for initiating an alarm; means for storing a frame sequence; means for calculating a time difference between two context changes; means for comparing a measured time difference with a threshold value; and means for initiating an alarm in response to the outcome of said means for comparing.

* * * * *